D. H. PHILLIPS.
Grain-Drill.
No. 12,557.
2 Sheets—Sheet 1.
Patented Mar. 20, 1855.
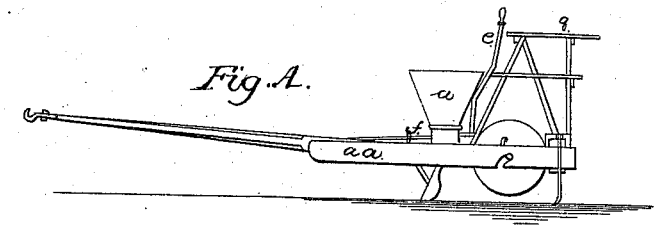
Fig. A.
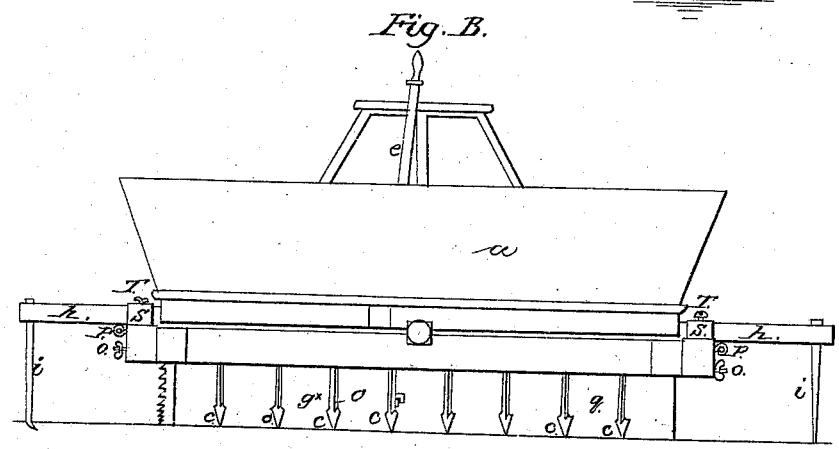
Fig. B.
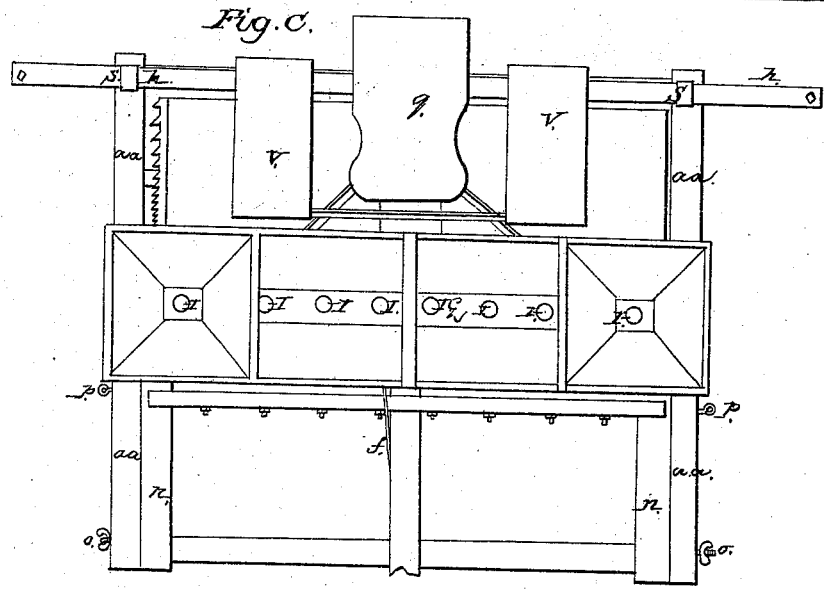
Fig. C.

D. H. PHILLIPS.
Grain-Drill.
No. 12,557.
2 Sheets—Sheet 2.
Patented Mar. 20, 1855.
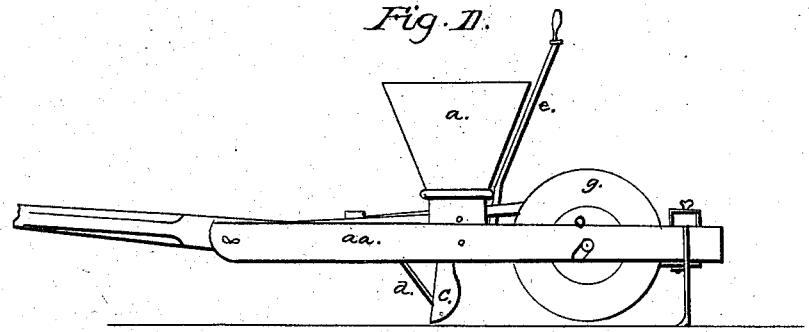
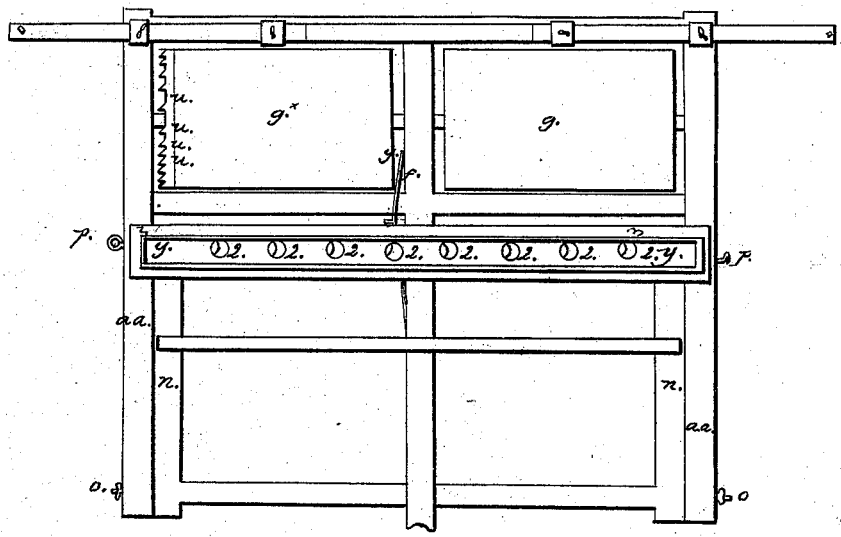

UNITED STATES PATENT OFFICE.

DANIEL H. PHILLIPS, OF GREENVILLE, ILLINOIS.

IMPROVEMENT IN SEED-PLANTERS.

Specification forming part of Letters Patent No. 12,557, dated March 20, 1855.

*To all whom it may concern:*

Be it known that I, DANIEL H. PHILLIPS, of the town of Greenville, county of Bond and State of Illinois, have invented a new and useful Improvement in Corn and Seed Planters, of which the following is a full, clear and exact description, reference being had to the accompanying drawings, forming part of this specification, and in which—

Figure A, Plate I, represents a side elevation of the planter, and Fig. B a front elevation thereof; Fig. C, a plan or top view, and in Plate II Fig. D represents a side elevation in part, showing the hinged frame with seed-box and other appurtenances raised; and Fig. E, a sectional plan through the line $b\ y\ a\ x$ in Fig. B of Plate I.

To enable others to make and use my invention, I will proceed to describe its construction and operation specifically.

I make a frame of hard lumber two and one-half inches thick by four inches in width, the frame to be varied in dimensions according to size of rollers, which frame is marked on Plates I and II, herewith filed, as $a\ a$. On the top of this frame, at the back side or next the rollers, is fixed a hopper or box for the purpose of holding the grain. (Marked $a$.) This hopper has two bottoms (marked $y$ and $z$) with a slide between them, each of the bottoms having holes placed opposite, at required distances apart, and the holes being marked I. The slide 2 also has holes in it, which are brought opposite the holes in the two bottoms $y$ and $z$ for the purpose of allowing the grain to pass by the spring $f$, (the slide in Plate II being marked in the Fig. E as 2.) The spring $f$ is struck when the machine is in motion by a cog, $u$, on the end of the roller $g^\times$, which moves the slide 2 between the two bottoms $y$ and $z$, and brings the holes in the slide opposite the holes in the two bottoms, and allows the grain to escape in quantities to correspond with the size of the cog in the roller, the spring F carrying back the slide to its place and cutting off the escape of more grain as soon as passed by the cog. The grain falls through the flukes $c\ c\ c\ c\ c$ to the ground. The frame N upon which the hopper sits is fixed inside of another frame, $a\ a$, and hinged thereto by bolts $o$, and held together at the back end of the frame by a rod, P, on either side, which rod P can be withdrawn and the back end of the frame N raised with the hopper and flukes attached for the purpose of clearing the flukes.

Behind the hopper $a$, in the frame $a\ a$, which is much longer than the frame N, is fixed a pair of rollers, $g^\times$ and $g$, of any size and length required. In the roller $g^\times$ is fixed the cog $u$, above alluded to, which strikes the spring F, moves the slide 2, so as to bring the holes in the slide exactly opposite the holes in the two bottoms $y$ and $z$ of the hopper, and the cog, passing immediately, allows the spring to carry back the slide to its place after the escape of a sufficient quantity of grain, which is regulated by the size of the cog $u$ and the holes in the slide and bottoms. This single cog is used for planting Indian corn. On the other end of the roller $g^\times$ is fixed a number of cogs, which are similar to the one described, and are brought to bear on the spring F, and work in the same manner by turning round the roller $g^\times$ with the other end inside. The flukes $c\ c\ c\ c$ are half-tubes, resembling a shovel-plow in shape, fastened into a cross-beam on the frame N. These flukes are made for the purpose of opening furrows to receive the grain that falls from the hopper $a$, and by raising or depressing the frame N by means of the rod P and various holes made for the purpose in the two frames the grain may be planted any required depth in the ground. Each of these flukes is fastened by a brace, $d$, which extends from the fluke to a cross-beam in the frame N. The brace $e$ is used for shutting off the spring F and stopping the falling of the grain. The rollers $g^\times$ and $g$ are used for leveling the ground, breaking the clods, and covering the grain. On the frame $a\ a$, above the rollers, is fixed a seat, $q$, with two planks, one on each side, $r$, for the feet of the driver. At the back of the machine, on either side, is attached a scribe or marker, $i$, of such form and so arranged as during the travel of the machine they produce a clear line-mark on the ground, outside of the machine's course, to direct the driver to operate the machine in a straight course and to gage in its opposite travels, so as to insure the grain being planted equally over the field. These markers $i$ are attached to side slides, $h$, which are made adjustable in sockets $s$, and held there by set-screws T, to vary the width apart of the markers $i$ as desired.

The tongue to which the horses are fastened is part of the frame N.

I do not claim as new opening the seed-delivering slide by a cog or projection on the carrying wheel or roller striking against a lever to operate the slide; neither do I claim closing the seed-slide after the roller has ceased to operate it by the action of the spring, but

What I claim as new and useful, and desire to secure by Letters Patent, is—

1. The employment of a spring-lever, $f$, to open and close the seed-slide in such a manner that while it serves to open the slide by the direct action of the revolving wheel or roller, as specified, the same lever by its elasticity closes the slide after the discharge has been made, as herein set forth.

2. Providing both ends of the carrying and leveling roller, which operates the seed-slide lever, with cogs or projections so arranged that by reversing the roller as described a slower or quicker movement is given to the delivery-slide according to the description of grain to be planted.

DANIEL H. PHILLIPS.

Witnesses:
TEVIS GREATHOUSE,
P. E. HOLCOMB.